US009575382B2

(12) United States Patent
Weber et al.

(10) Patent No.: US 9,575,382 B2
(45) Date of Patent: Feb. 21, 2017

(54) ELECTRONIC DEVICE HAVING DISPLAY WITH SPLIT DRIVER LEDGES

(71) Applicant: Apple Inc., Cupertino, CA (US)

(72) Inventors: Douglas J. Weber, Arcadia, CA (US); Kenneth A. Jenks, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 13/971,405

(22) Filed: Aug. 20, 2013

(65) Prior Publication Data

US 2015/0055036 A1    Feb. 26, 2015

(51) Int. Cl.
*G02F 1/1345* (2006.01)
*G02F 1/1362* (2006.01)
*G02F 1/1333* (2006.01)

(52) U.S. Cl.
CPC . *G02F 1/1362* (2013.01); *G02F 2001/133302* (2013.01); *G02F 2201/56* (2013.01)

(58) Field of Classification Search
CPC ............... G02F 1/13452; G02F 1/1362; G02F 2001/133302; G02F 2201/56
USPC .................................................. 349/149–152
See application file for complete search history.

(56) References Cited

U.S. PATENT DOCUMENTS

| 7,746,007 B2 | 6/2010 | Cauffield |
| 7,940,365 B2 | 5/2011 | Gettemy et al. |
| 8,334,960 B2 * | 12/2012 | Yang et al. ............ 349/149 |
| 2005/0237467 A1 * | 10/2005 | Takaishi ............... 349/149 |
| 2007/0085961 A1 * | 4/2007 | Jeong ............ H01L 27/3276 349/149 |
| 2007/0164954 A1 * | 7/2007 | Yang ............... G09G 3/3677 345/88 |
| 2008/0117367 A1 * | 5/2008 | Abe ............... G02F 1/13452 349/106 |
| 2013/0016267 A1 * | 1/2013 | Ko ................. G06F 1/1637 348/333.01 |
| 2013/0107476 A1 | 5/2013 | Wright et al. |
| 2013/0135359 A1 | 5/2013 | Gally et al. |
| 2013/0176317 A1 | 7/2013 | Li et al. |

OTHER PUBLICATIONS

U.S. Appl. No. 13/490,287, filed Jun. 6, 2012.
U.S. Appl. No. 12/916,475, filed Oct. 29, 2010.

* cited by examiner

*Primary Examiner* — Charles Chang
(74) *Attorney, Agent, or Firm* — Treyz Law Group, P.C.; G. Victor Treyz; Joseph F. Guihan

(57) ABSTRACT

An electronic device may be provided with a display. The display may be a liquid crystal display having a thin-film transistor layer and a color filter layer. The thin-film transistor layer may have diagonally opposed recesses in its edges that form diagonally opposed display driver ledges that protrude outwardly from under the color filter layer. Display driver circuitry may be mounted on the display driver ledges. Gate driver circuitry may be formed on the thin-film transistor layer. Recesses may be formed along the left and right edges of the display to form left and right display driver ledges to support the gate driver circuitry. A single display drive integrated circuit or multiple display driver integrated circuits may be mounted on each display driver ledge. The recesses may accommodate components in the electronic device such as a camera and audio jack or other components.

20 Claims, 7 Drawing Sheets

ELECTRONIC DEVICE HAVING DISPLAY WITH SPLIT DRIVER LEDGES

BACKGROUND

This relates generally to electronic devices and, more particularly, to electronic devices with displays.

Electronic devices often include displays. For example, cellular telephones and portable computers include displays for presenting information to users. Displays such as liquid crystal displays contain multiple layers. A liquid crystal display may, for example, have upper and lower polarizer layers, a color filter layer that contains an array of color filter elements, a thin-film transistor layer that includes thin-film transistors and display pixel electrodes, and a layer of liquid crystal material interposed between the color filter layer and the thin-film transistor layer. The edge of the thin-film transistor layer may protrude from beneath the color filter layer, providing a ledge on which circuitry such as a display driver integrated circuit can be mounted. The display driver integrated circuit can receive information on images to be displayed on the display from a processor located on a printed circuit board. The display driver circuit contains drivers that drive data signals onto conductive traces on the thin-film transistor layer. The presence of the display driver ledge allows the display driver integrated circuit to be mounted in close proximity to the thin-film transistor circuitry on the thin-film transistor layer.

The driver ledge is generally located at one of the edges of the display. For example, in a cellular telephone display, the driver ledge may be located at the top or bottom end of the display. The use of this type of display configuration can give rise to challenges when mounting the display in the housing of an electronic device. If care is not taken, the display may need to be mounted in an off center location to provide sufficient room for the circuitry associated with the driver ledge. This type of off center positioning of the display can be aesthetically unappealing. To provide a more visually appealing layout, the housing of the electronic device can be enlarged. An enlarged electronic device housing may allow the display to be centered within the device, but adds undesirable bulk.

It would therefore be desirable to be able to provide improved electronic devices with displays.

SUMMARY

An electronic device may be provided with a display. The display may be a liquid crystal display having a thin-film transistor layer and a color filter layer. The thin-film transistor layer may have diagonally opposed recesses in its edges. The recesses form diagonally opposed display driver ledges that protrude outwardly from under the color filter layer.

Display driver circuitry may be mounted on the diagonally opposed display driver ledges. Gate driver circuitry may be formed on the thin-film transistor layer. Recesses may be formed along the left and right edges of the display to form left and right display driver ledges to support the gate driver circuitry. A single display drive integrated circuit or multiple display driver integrated circuits may be mounted on each display driver ledge.

The recesses in the thin-film transistor layer may be configured to accommodate components in the electronic device such as a camera and audio jack or other components, thereby facilitating placement of the display in a desired location within the electronic device.

DETAILED DESCRIPTION

A display in an electronic device may be provided with driver circuitry for displaying images on an array of display pixels. The driver circuitry, which may include driver integrated circuits, may be mounted on diagonally opposed display driver ledges in the display. Recessed display portions may be used in defining the locations of the display driver ledges. Internal device space that is made available by the presence of the recessed display portions may be used to accommodate device components.

Figure 1:
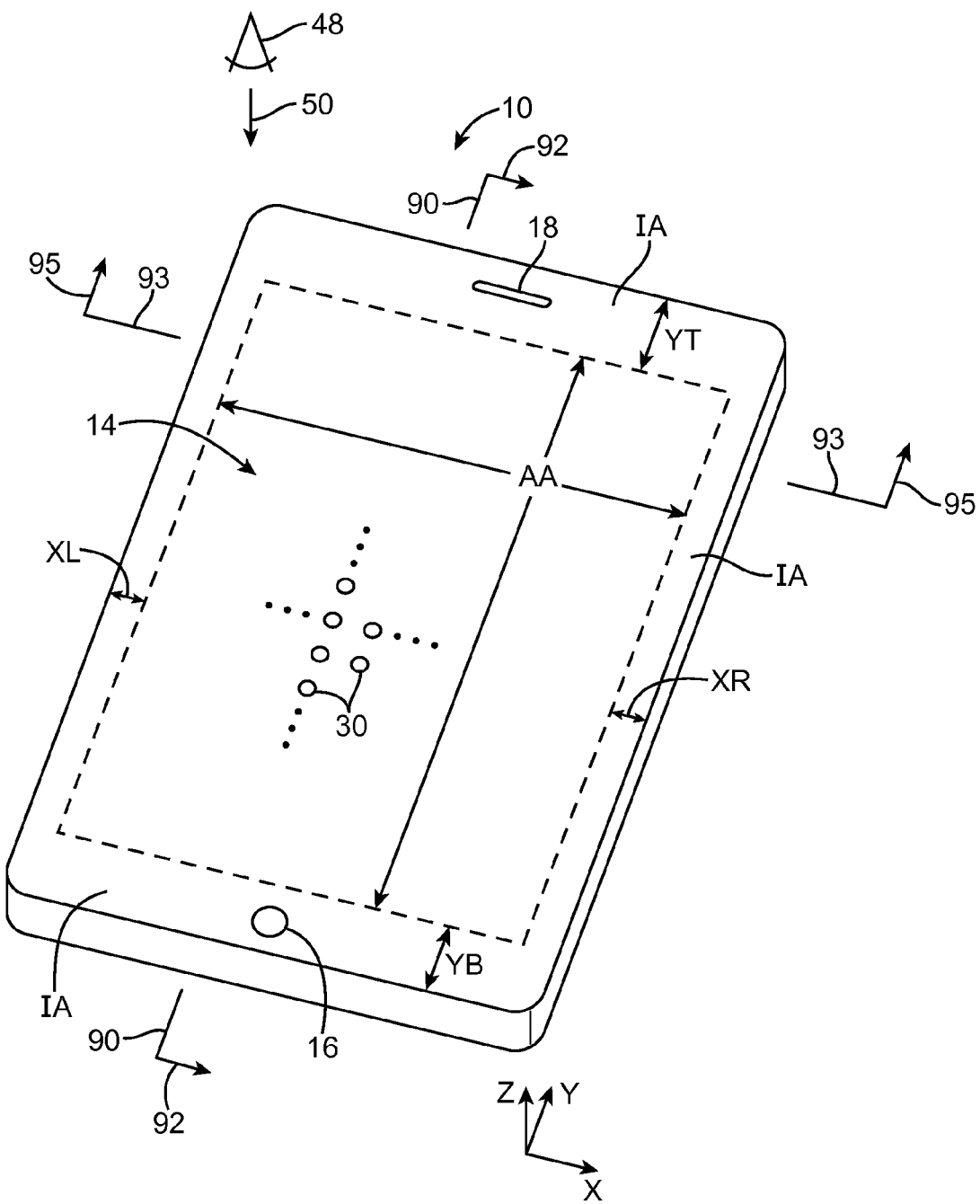
FIG. 1 is a perspective view of an illustrative electronic device such as a handheld computing device or other electronic device that may be provided with a display in accordance with an embodiment.

An illustrative electronic device of the type that may be provided with a display is shown in FIG. 1. Device 10 may be computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device.

Device 10 may have one or more displays such as display 14 mounted in housing structures such as housing 12. Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels 30 that are formed from liquid crystal display (LCD) components or other suitable display pixel structures.

A display cover layer may cover the surface of display 14 or a display layer such as a color filter layer (e.g., a layer formed from a clear substrate covered with patterned color filter elements) or other portion of a display may be used as the outermost (or nearly outermost) layer in display 14. The outermost display layer may be formed from a transparent glass sheet, a clear plastic layer, or other transparent member. If desired, openings may be formed in the outermost layer of display 14 to accommodate components such as button 16 and speaker port 18 of FIG. 1 (as examples). Buttons, connector ports, and other structures may also be accommodated using openings in housing 12.

Display 14 may have an inactive portion such as inactive area IA that surrounds an active portion such as active area AA. Active area AA may, for example, form a rectangular central portion of display 14 (when viewed in direction 50 by viewer 48) and may be surrounded by an inactive area IA with the shape of a rectangular ring. Display 14 may have other active area shapes and inactive area shapes, if desired. Configurations in which an inactive area IA extends along each of the four edges of a rectangular active area AA may sometimes be described herein as an example.

Active area AA contains a rectangular array of display pixels 30 for displaying images for viewer 48. Inactive area IA does not contain display pixels and does not display images. To block internal components from view, the underside of the outermost display layer in display 14 in inactive area IA may be coated with an opaque masking material such as a layer of opaque ink.

To enhance device aesthetics and to minimize device bulk, it may be desirable to mount display 14 within device 10 so that border widths such as widths YB and YT are equal and so the border widths such as widths XL and XR are equal or to otherwise place display 14 in an aesthetically pleasing location. In doing so, it may be challenging to provide sufficient space within housing 12 to accommodate components.

Challenges such as these may be addressed by providing one or more layers of display 14 with notches or other recesses. For example, recesses may be formed in the thin-film transistor layer of a liquid crystal display. The display layer recesses may be used to accommodate device components such as a front-facing camera, a rear-facing camera, a memory card slot, an audio jack, buttons, a camera flash, lanyard mounting hardware, antenna structures, printed circuit board components, a vibrator, digital data connector, a subscriber identity module (SIM) card, an integrated circuit, other electrical components, housing structures, or other structures in device 10. The recesses may be diagonally opposed from each other and may form associated diagonally opposed driver ledges for mounting display driver circuitry. Using the diagonally opposed recesses and driver ledges, display 14 may be mounted in a desired location within device 10 while accommodating device components. For example, display 14 may be mounted within housing 12 of device 10 in a position that equalizes widths YB and YT without enlarging widths XL and XR while components are received within the diagonally opposed recesses. As an example, an upper recess may be used to receive a camera while a lower recess is used to receive an audio jack and a digital data connector.

Figure 2:
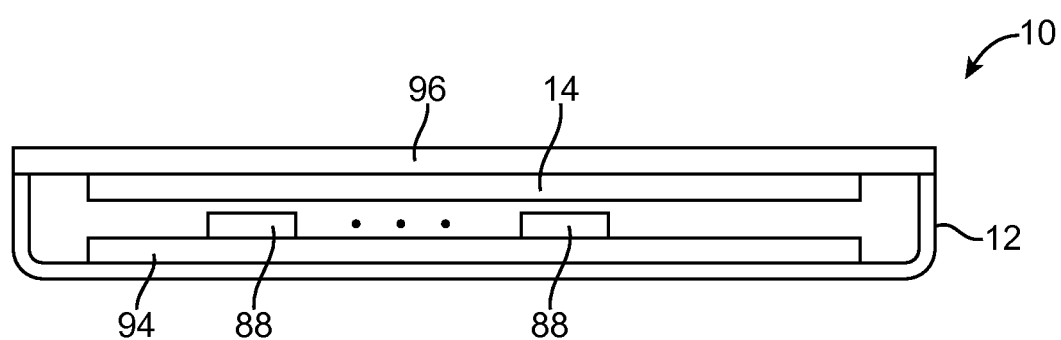
FIG. 2 is a cross-sectional side view of an electronic device of the type that may be provided with a display in accordance with an embodiment.

FIG. 2 is a cross-sectional side view of device 10 taken along line 93 and viewed in direction 95 of FIG. 1. As shown in FIG. 2, device 10 may include a display cover layer such as display cover layer 96 mounted on the upper (front) face of device housing 12. Display layers such as a color filter layer, thin-film transistor layer, and other layers of display 14 may be mounted below display cover layer 96. Display cover layer 96 (which may be considered to be part of the display of device 10) may be formed from a layer of glass, a layer of clear plastic, or other transparent material.

Internal components 88 in device 10 may be mounted on substrates such as substrate 94. Substrate 94 may be a rigid printed circuit board (e.g., a printed circuit board formed from fiberglass-filled epoxy) or may be a flexible printed circuit (e.g., a flex circuit formed from a flexible layer of polyimide or a flexible sheet of other polymer material). Using patterned metal traces and other signal lines, circuitry (e.g., electrical components 88 and other circuits in device 10) may be interconnected within device 10. Components 88 may include integrated circuits, connectors, sensors, display components, audio components, switches, discrete components such as inductors, capacitors, and resistors, buttons, a camera flash (e.g., a light-emitting diode), antennas, integrated circuits, vibrator motors and other actuators, cameras, SIM cards, memory cards, and other electrical components. Mechanical components such as lanyard mounting hardware, internal housing frame structures, and other components may also be mounted in housing 12 in a location that protrudes partly or fully into the recesses formed in a display layer.

In general, any suitable number of display layers (e.g., one or more than one) may be provided with recesses to help accommodate mechanical and electrical components such as components 88 so that display 14 may be mounted in a desired position within housing 12. For example, a thin-film transistor substrate in a liquid crystal display or other display layer in display 14 may be provided with multiple recesses to help accommodate the mounting of components in device 10. The recesses may be provided on opposing ends (edges) of the thin-film transistor layer.

Figure 3:
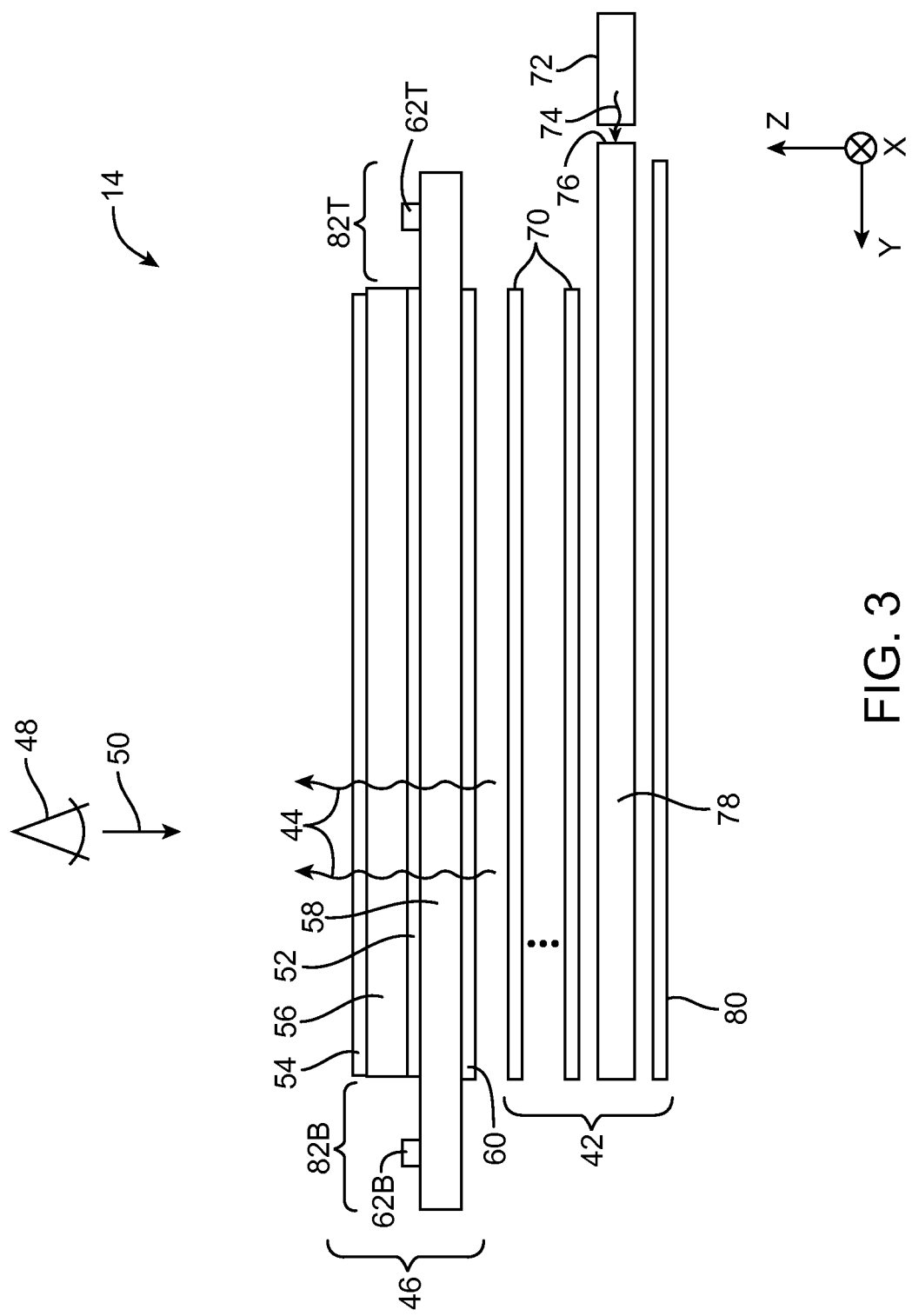
FIG. 3 is a cross-sectional side view of an electronic device display in accordance with an embodiment.

A cross-sectional side view of display 14 taken along line 90 of FIG. 1 and viewed in direction 92 is shown in FIG. 3. As shown in FIG. 3, display 14 may include backlight structures such as backlight unit 42 for producing backlight 44. During operation, backlight 44 travels outwards (vertically upwards in dimension Z in the orientation of FIG. 3) and passes through display pixels 30 in display layers 46. In this way, backlight 44 illuminates images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion or other structures in housing 12). Display layers 46 may form a liquid crystal display or may be used in forming displays of other types. A display cover layer such as display cover layer 96 may be used to cover and protect display layers 46 (see, e.g., FIG. 2).

In a configuration in which display layers 46 are used in forming a liquid crystal display, display layers 46 include a liquid crystal layer such a liquid crystal layer 52. Liquid crystal layer 52 is sandwiched between display layers such as display layers 58 and 56. Layers 56 and 58 are interposed between lower polarizer layer 60 and upper polarizer layer 54.

Layers 58 and 56 are formed from transparent substrate layers such as clear layers of glass or plastic. Layer 58 may be a thin-film transistor layer (e.g., a thin-film-transistor substrate such as a glass layer coated with a layer of thin-film transistor circuitry for forming display pixel electrodes and transistors that control the application of signals to the electrodes). Layer 56 may be a color filter layer (e.g., a color filter layer substrate such as a layer of glass having a layer of color filter elements such as red, blue, and green color filter elements arranged in an array). Conductive traces, color filter elements, transistors, and other circuits and structures are formed on the substrates of display layers 46. For example, thin-film transistors are formed on the glass or plastic substrate layer associated with thin-film transistor layer 58, color filter elements may be formed on the glass or plastic substrate associated with color filter layer 56, etc. If desired, touch sensor electrodes may also be incorporated into layers such as layers 58 and 56 and/or touch sensor electrodes may be formed on other substrates. For example, an array of transparent indium tin oxide capacitive touch sensor electrodes may be formed on a layer of polyimide in display 14.

With one illustrative configuration, layer 58 is a thin-film transistor layer that includes an array of thin-film transistors and associated electrodes (display pixel electrodes) for applying electric fields to liquid crystal layer 52 and thereby displaying images on display 14. Layer 56 is a color filter layer that includes an array of color filter elements for providing display 14 with the ability to display color images. If desired, the color filter layer may be placed on the inner surface of display 14 and the thin-film transistor layer may be placed on the outer surface of display 14.

During operation of display 14 in device 10, control circuitry (e.g., one or more integrated circuits mounted on a printed circuit in device 10) may be used to generate information to be displayed on display 14 (e.g., display data). The information to be displayed may be conveyed to display driver circuitry such as display driver integrated circuit 62B and display driver integrated circuit 62T using signal paths such as signal paths formed from conductive metal traces in flexible printed circuits (as an example).

Display driver circuitry such as display driver integrated circuits 62B and 62T of FIG. 3 may be mounted on thin-film-transistor layer driver ledges. Thin-film transistor layer 58 may have portions that extend outwardly from color filter layer 56 and that are therefore not covered by color filter layer 56. The extending portions of thin-film transistor layer 58 form driver ledges (i.e., the portions of thin-film transistor layer 58 that protrude outwardly from under color filter layer 56 and that are therefore not overlapped by color filter layer 56 form driver ledges). Conductive traces (e.g., metal signal lines) on the surface of the thin-film transistor driver ledges may be used in routing display signals to display circuitry on thin-film transistor layer 58. Display driver integrated circuits may be coupled to the conductive traces using solder or conductive adhesive.

In the FIG. 3 example, thin-film transistor layer 58 has two driver ledges formed from portions of the thin-film transistor layer that extend outwardly from under color filter layer 56: driver ledge 82B and driver ledge 82T. Driver ledges 82B and 82T may be diagonally opposed from each other across the surface of display 14 (when viewed in direction 50 by viewer 48). Display driver circuitry such as display driver integrated circuit 62B may be mounted on thin-film transistor driver ledge 82B. Display driver circuitry such as display driver integrated circuit 62T may be mounted on opposing thin-film transistor driver ledge 82T. Display driver integrated circuits 62B and 62T may be used in driving display signals into the array of display pixels 30 on display 14. Display driver ledges such as ledges 82B and 82T may be formed as part of the process of dividing a large glass panel into individual thin-film transistor layer pieces of the type shown in FIG. 3. Individual thin-film transistor layer pieces may be cut from a larger panel using laser scribing or other laser-based processing techniques, using machining, using mechanical scribing techniques, etc.

Backlight structures 42 include a light guide plate such as light guide plate 78. Light guide plate 78 is formed from a transparent material such as clear glass or plastic. In a configuration in which display 14 has a rectangular footprint in the X-Y plane (i.e., a rectangular outline when viewed in direction 50 by viewer 38), light guide plate 78 may have a rectangular shape.

During operation of backlight structures 42, a light source such as light source 72 generates light 74. Light source 72 may be, for example, an array of light-emitting diodes. Light-emitting diodes 72 may run along one or more of the edges of light guide plate 78. Light 74 from one or more light sources such as light-emitting diode(s) 72 is coupled into one or more corresponding edge surfaces such as edge surface 76 of light guide plate 78 and is distributed in dimensions X and Y throughout light guide plate 78 due to the principal of total internal reflection. Light guide plate 78 may have light-scattering features such as pits and bumps. The light-scattering features may be located on the upper surface and/or on the opposing lower surface of light guide plate 78.

Light 74 that scatters upwards in direction Z from light guide plate 78 serves as backlight 44 for display 14. Light 74 that scatters downwards is reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 3, optical films 70 and reflector 80 preferably have a corresponding rectangular shape.

Figure 4:
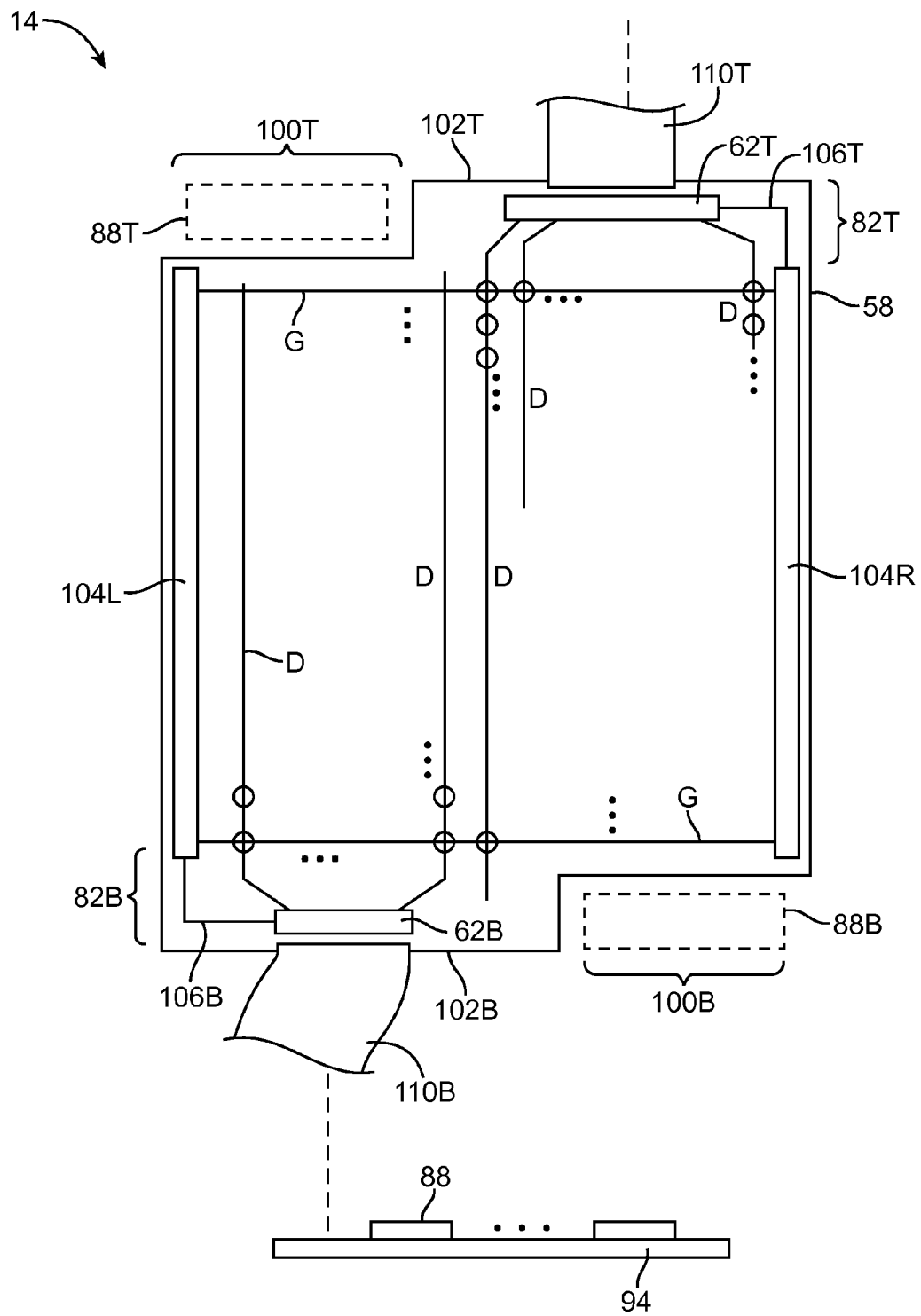
FIG. 4 is a top view of an electronic device display with a pair of diagonally opposed display layer edge recesses and a pair of associated diagonally opposed driver ledges and in accordance with an embodiment.

The locations of driver ledges 82B and 82T and respective display driver integrated circuits 62B and 62T may help accommodate components within the interior of housing 12 and device 10, so that display 14 can be mounted in a desired position while minimizing device size. FIG. 4 is a top view of display 14 showing how display 14 may include an array of display pixels 30 formed from thin-film transistor structures on thin-film transistor layer 58. Display pixels 30 may be organized in an array having rows and columns. Vertically extending data lines D convey data signals from display driver integrated circuits 62B and 62T to display pixels 30. Horizontally extending gate lines G are asserted in sequence to load the data D on the data lines into respective rows of the display pixels 30. Gate driver circuitry 104L and 104R may be used in asserting the gate line signals on gate lines G. Gate driver circuitry 104L and 104R may be implemented using thin-film transistor circuitry on thin-film transistor substrate 58 or may be implemented using gate driver circuitry in display driver integrated circuits such as circuits 62B and 62T. Timing and control signals may be supplied from display driver integrated circuit 62B to gate driver circuitry 104L using path 106B. Timing and control signals may be supplied from display driver integrated circuit 62T to gate driver circuitry 104R using path 106T.

Flexible printed circuits or other signal buses may be used to convey signals between a main logic board or other printed circuit to display driver circuitry in display 14. For example, circuitry 88 on printed circuit 94 may be coupled to flexible printed circuits 110T and 110B. Flexible printed circuit 110T may be coupled to thin-film transistor layer 58 adjacent to display driver integrated circuit 62T to handle signals associated with operating display driver integrated circuit 62T. Flexible printed circuit 100B may be coupled to thin-film transistor layer 58 adjacent to display driver integrated circuit 62B to handle signals associated with operating display driver integrated circuit 62B.

Thin-film transistor layer 58 may be formed from a substrate material such as a planar layer of glass or plastic on which thin-film transistor structures, conductive lines, and other circuits are formed (e.g., data lines D, gate lines G, gate driver circuitry 104L and 104R, and display pixels 30). Recesses may be formed along the edges of the thin-film transistor layer. The recesses may, for example, be diagonally opposed to each other. Adjacent, diagonally opposed thin-film transistor layer display driver ledges may be formed as a result of forming the recesses.

In the illustrative configuration of FIG. 4, for example, thin-film transistor layer 58 is rectangular and has four edges. Upper edge 102T has recess 100T. Lower edge 102B has recess 100B. Recesses 100T and 100B are diagonally opposed to each other and can be used to accommodate components 88 within the interior of housing 12 and device 10. For example, a component such as component 88T may be mounted within recess 100T and a component such as component 88B may be mounted within recess 100B. Component 88T and/or component 88B may be a front-facing camera, a rear-facing camera, a memory card slot, an audio jack, buttons, a camera flash, lanyard mounting hardware, antenna structures, printed circuit board components, a vibrator, a digital data port connector, a subscriber identity module (SIM) card, an integrated circuit, other electrical components, a housing structure, etc.

The shapes of recesses 100T and 100B in the example of FIG. 4 are long and rectangular. Other shapes may be used if desired. The presence of recesses 100T and 100B gives rise to associated display driver ledges on thin-film transistor layer 58. For example, the presence of upper recess 100T in edge 102T of thin-film transistor layer 58 forms upper driver ledge 82T. The presence of lower recess 100B in edge 102B of thin-film transistor layer 58 forms lower driver ledge 82B. Driver ledges 82T and 82B are diagonally opposed to each other. Driver ledge 82T is located in the upper right corner of thin-film transistor layer 58, whereas driver ledge 82B is located in the lower left corner of thin-film transistor layer 58. Display pixel signal lines such as paths 106B and 106T and data lines D fan out from display driver integrated circuits 62B and 62T. With the configuration of FIG. 4, the signal lines associated with display driver 62B are used in displaying images on display pixels 30 on the left side of display 14. The signal lines associated with display driver 62T are used in displaying images on display pixels 30 on the right side of display 14. Data line driver circuitry (sometimes referred to as column driver circuitry) in integrated circuits 62B and 62T and/or associated display driver circuitry can be calibrated when manufacturing display 14 to ensure that there is no visible difference between the images displayed on the right and left sides of display 14 during operation.

Figure 5:
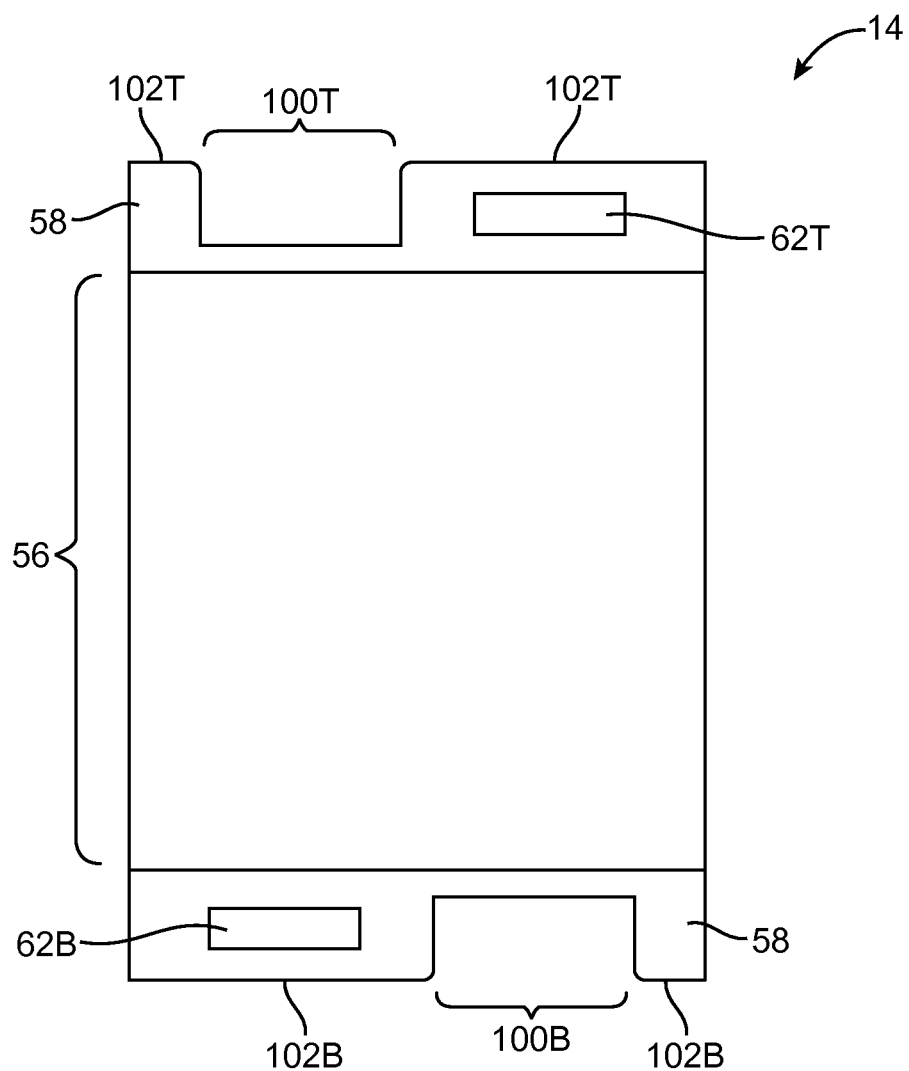
FIG. 5 is a top view of an illustrative electronic device display with a pair of diagonally opposed display layer notches and a pair of associated diagonally opposed driver ledges in accordance with an embodiment.

As shown in FIG. 5, recesses 100T and 100B may be formed in the shape of notches. For example, recess 100T may form a notch in upper edge 102T, so that unrecessed portions of edge 102T remain on either side of notch 100T. Likewise, recess 100B may form a notch in lower edge 102B, so that unrecessed portions of edge 102B remain on either side of notch 100B. Components 88 may be placed in notches 100T and/or 100B. Notches may have semicircular shapes, shapes with curved edges, shapes with straight edges, shapes with a combination of straight and curved sides, or other suitable shapes.

Figure 6:
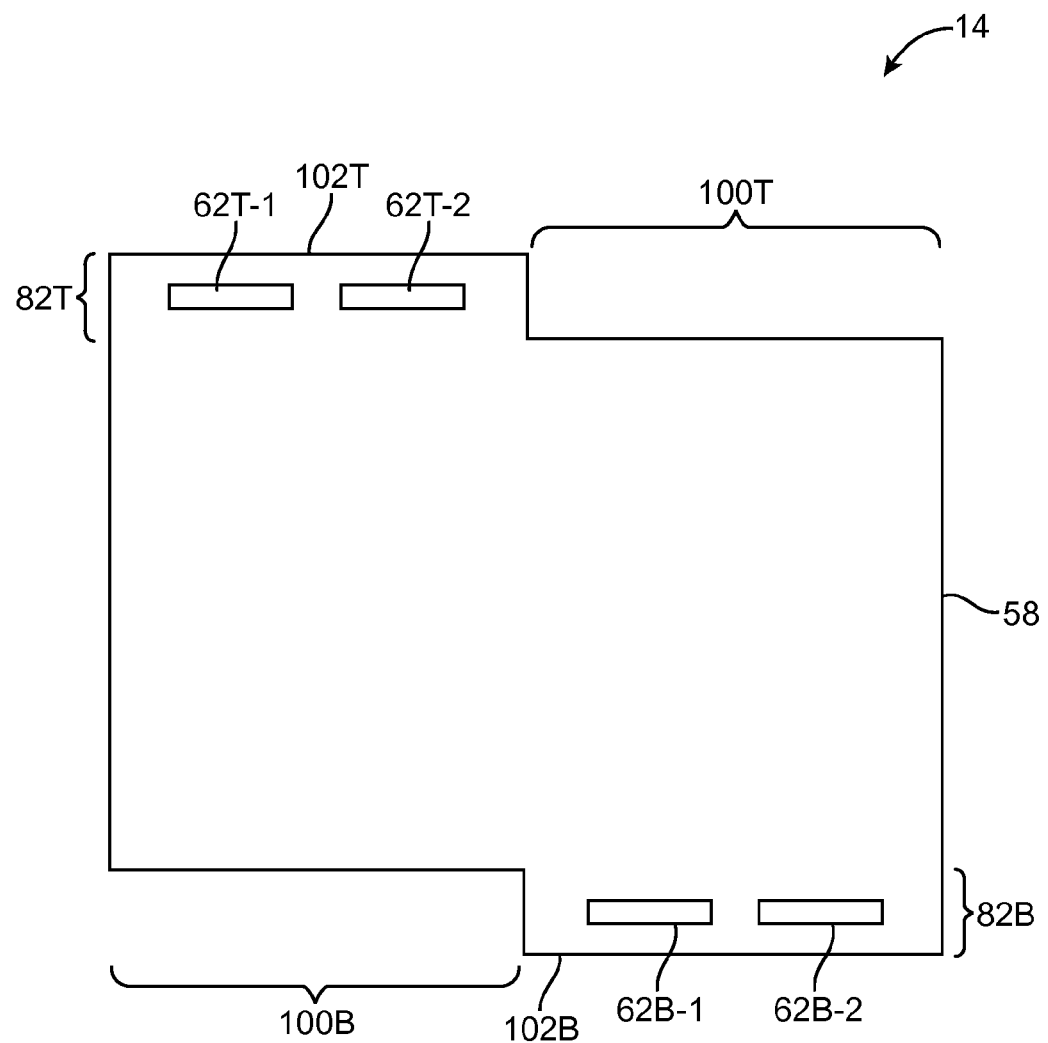
FIG. 6 is a top view of an illustrative electronic device display with a pair of diagonally opposed display driver ledges each of which includes a pair of display driver integrated circuits in accordance with an embodiment.

If desired, multiple display driver integrated circuits may be mounted on each of the diagonally opposed display driver ledges in display 14. As shown in FIG. 6, for example, thin-film transistor layer 58 may have diagonally opposed recesses 100T and 100B in respective upper and lower edges 102T and 102B that define respective upper and lower diagonally opposed display driver ledges 82T and 82B. Each ledge may be used to support one or more integrated circuits. In the FIG. 6 example, upper display driver ledge 82T supports display driver integrated circuits 62T-1 and 62T-2 and display driver integrated circuits 62B-1 and 62B-2 are mounted on lower display driver ledge 82B.

Figure 7:
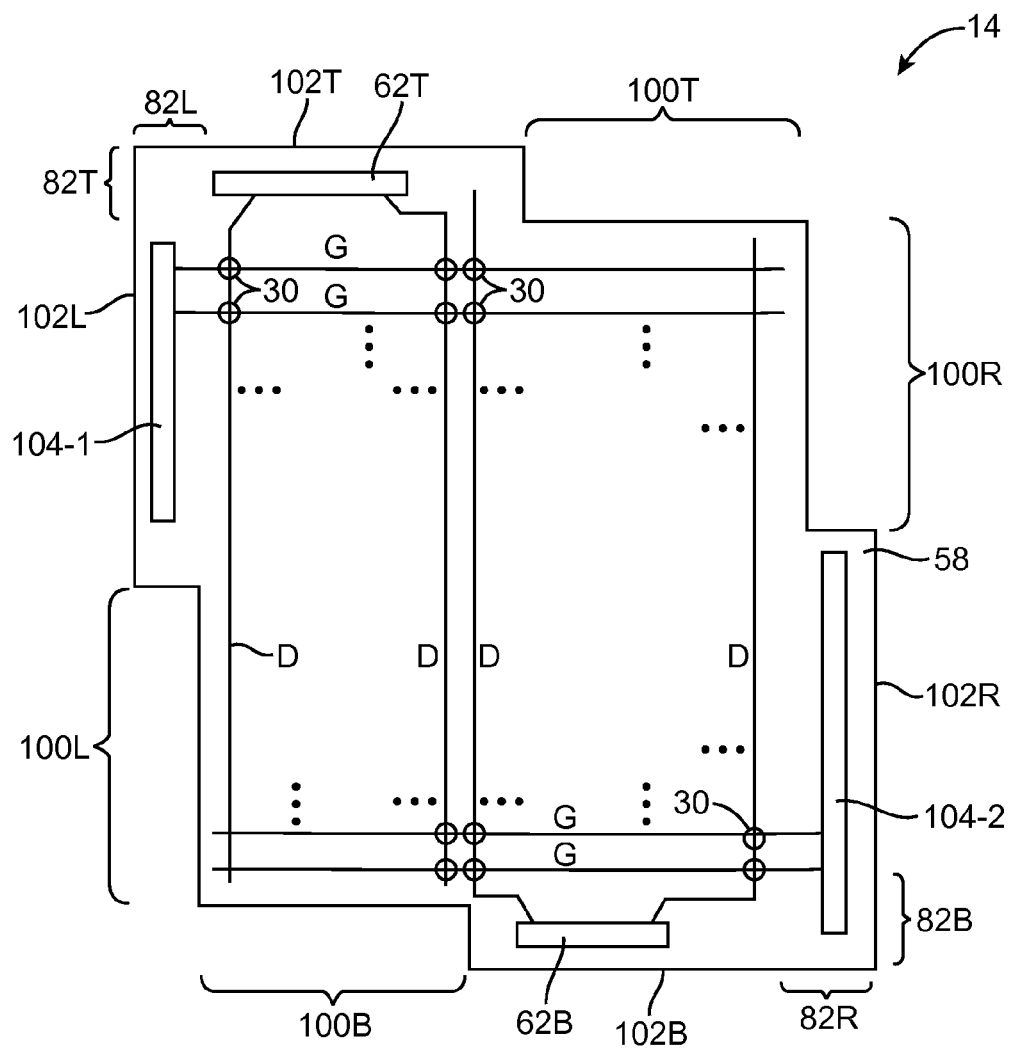
FIG. 7 is a top view of an illustrative electronic device display with four display driver ledges and four associated display layer corner recesses in accordance with an embodiment.

In the illustrative configuration of FIG. 7, thin-film transistor layer 58 in display 14 has recesses and display driver ledges on four edges. Upper edge 102T has recess 100T, which forms display driver ledge 82T. Display driver integrated circuit 62T is mounted on display driver ledge 82T. Lower edge 102B has recess 100B, which forms display driver ledge 82B for mounting circuit 62B. Left edge 102L has recess 100L, which forms display driver ledge 82L. Display driver circuitry such as gate driver circuitry 104-1 may be formed on ledge 82L. Right edge 102R has recess 100R, which forms display driver ledge 82R. Display driver circuitry such as gate driver circuitry 104-2 may be formed on ledge 82R. Components 88 may be mounted in recesses 100L, 100T, 100R, and/or 100B.

If desired, fewer recesses may be formed in thin-film transistor layer 58, recesses may be formed with different shapes and sizes, recesses may be diagonally opposed so that the resulting ledges formed in thin-film transistor layer 58 will be diagonally opposed or other layouts may be used for the recesses and display driver ledges. Display circuitry mounted on the display driver ledges may include thin-film transistor circuitry such as polysilicon transistors, amorphous silicon transistors, or other thin-film transistors and/or may include integrated circuits.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    at least one display layer with first and second diagonally opposed recesses that form associated first and second diagonally opposed display driver ledges;
    display driver circuitry mounted on the first and second display driver ledges;
    a first component mounted in the first recess; and
    a second component mounted in the second recess, wherein the first and second components are components selected from the group consisting of: a front-facing camera, a rear-facing camera, a memory card slot, an audio jack, a button, a camera flash, lanyard mounting hardware, an antenna structure, a vibrator, a digital data port connector, a subscriber identity module (SIM) card, an integrated circuit, and a housing structure.

2. The display defined in claim 1 wherein the display layer comprises a thin-film transistor layer.

3. The display defined in claim 2 further comprising:
    a color filter layer; and
    a layer of liquid crystal material between the color filter layer and the thin-film transistor layer, wherein the display driver ledges extend outwards from under the color filter layer.

4. The display defined in claim 3 wherein the display driver circuitry includes a first display driver integrated circuit mounted on the first display driver ledge and includes a second display driver integrated circuit mounted on the second display driver ledge.

5. The display defined in claim 4 further comprising a third display driver integrated circuit mounted on the first display driver ledge and a fourth display driver integrated circuit mounted on the second display driver ledge.

6. The display defined in claim 4 further comprising gate lines and data lines on the thin-film transistor layer.

7. The display defined in claim 6, wherein the first and second display driver integrated circuits are coupled to the data lines.

8. The display defined in claim 2 wherein the thin-film transistor layer has four edge recesses respectively in upper and lower and left and right edges and wherein the display driver ledges include an upper display driver ledge formed along the upper edge, a lower display driver ledge formed along the lower edge, a left display driver ledge formed along the left edge, and a right display driver ledge formed along the right edge.

9. The display defined in claim 8 wherein the display driver circuitry includes a first display driver integrated circuit on the upper edge and a second display driver circuit on the lower edge.

10. The display defined in claim 9 wherein the display driver circuitry includes thin-film transistor gate driver circuitry on the left display driver edge and on the right display driver ledge.

11. An electronic device, comprising:
    a housing;
    a display mounted in the housing, wherein the display comprises a thin-film transistor layer having first and second diagonally opposed display driver ledges formed from recesses in the thin-film transistor layer;
    a first flexible printed circuit attached to the first display driver ledge; and
    a second flexible printed circuit attached to the second display driver ledge.

12. The electronic device defined in claim 11 wherein the display comprises a liquid crystal display having a color filter layer on the thin-film transistor layer, wherein the display driver ledges extend out from under the color filter layer.

13. The electronic device defined in claim 12 wherein the recesses include a first recess adjacent to the first display driver ledge and a second recess adjacent to the second display driver ledge, wherein a first component is mounted in the first recess, and wherein a second component is mounted in the second recess.

14. The electronic device defined in claim 13 wherein the first component comprises a camera and wherein the second component comprises an audio jack.

15. The electronic device defined in claim 14 further comprising a first display driver integrated circuit mounted on the first display driver ledge and a second display driver integrated circuit mounted on the second display driver ledge.

16. The electronic device defined in claim 11 further comprising:
    a printed circuit in the housing;
    components mounted on the printed circuit;
    a display cover layer that covers the display; and
    an opening in the display cover layer.

17. A liquid crystal display, comprising:
    an upper polarizer layer;
    a lower polarizer layer;
    a liquid crystal layer;
    a color filter layer between the upper polarizer and the liquid crystal layer;
    a thin-film transistor layer between the lower polarizer and the liquid crystal layer, wherein the thin-film transistor layer has first and second opposing edges connected by third and fourth opposing edges, a first recess in the first edge, and a second recess in the second edge, and wherein the first and second recesses form first and second diagonally opposed display driver ledges in the thin-film transistor layer that protrude from under the color filter layer;
    gate lines and data lines on the thin-film transistor layer;
    gate driver circuitry on the third and fourth opposing edges that is coupled to the gate lines;
    a first display driver integrated circuit on the first display driver ledge, wherein the first display driver integrated circuit is coupled to a first portion of the data lines; and
    a second display driver integrated circuit on the second display driver ledge, wherein the second display driver integrated circuit is coupled to a second portion of the data lines.

18. The liquid crystal display defined in claim 17 wherein the thin-film transistor layer has an upper edge and an upper recess in the upper edge that forms the first display driver ledge and wherein the thin-film transistor layer has a lower edge and a lower recess in the lower edge that forms the second display driver edge.

19. The liquid crystal display defined in claim 17, further comprising:
    a first flexible printed circuit attached to the first display driver ledge, wherein the first flexible printed circuit is configured to handle signals associated with operating the first display driver integrated circuit; and
    a second flexible printed circuit attached to the second display driver ledge, wherein the second flexible printed circuit is configured to handle signals associated with operating the second display driver integrated circuit.

20. The liquid crystal display defined in claim 19, further comprising:
  a first component mounted in the first recess, wherein the first component is a component selected from the group consisting of: a front-facing camera, a rear-facing camera, a memory card slot, an audio jack, a button, a camera flash, lanyard mounting hardware, an antenna structure, a vibrator, a digital data port connector, a subscriber identity module (SIM) card, an integrated circuit, and a housing structure; and
  a second component mounted in the second recess, wherein the second component is a component selected from the group consisting of: a front-facing camera, a rear-facing camera, a memory card slot, an audio jack, a button, a camera flash, lanyard mounting hardware, an antenna structure, a vibrator, a digital data port connector, a subscriber identity module (SIM) card, an integrated circuit, and a housing structure.

* * * * *